United States Patent
Satoh

(10) Patent No.: US 9,338,014 B2
(45) Date of Patent: *May 10, 2016

(54) NETWORK SYSTEM, CERTIFICATE MANAGEMENT METHOD, AND CERTIFICATE MANAGEMENT PROGRAM

(71) Applicant: Ricoh Company, Ltd., Tokyo (JP)

(72) Inventor: Yoshimi Satoh, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 85 days.

This patent is subject to a terminal disclaimer.

(21) Appl. No.: 14/267,419

(22) Filed: May 1, 2014

(65) Prior Publication Data

US 2014/0244999 A1 Aug. 28, 2014

Related U.S. Application Data

(63) Continuation of application No. 13/762,638, filed on Feb. 8, 2013, now Pat. No. 8,745,377.

(30) Foreign Application Priority Data

Feb. 28, 2012 (JP) ................................ 2012-041404

(51) Int. Cl.
*H04L 29/06* (2006.01)
*H04L 9/32* (2006.01)

(52) U.S. Cl.
CPC .......... *H04L 9/3268* (2013.01); *H04L 63/0823* (2013.01)

(58) Field of Classification Search
CPC ................... H04L 9/3268; H04L 63/0823
See application file for complete search history.

(56) References Cited

U.S. PATENT DOCUMENTS 7,581,102 B2 * 8/2009 Yasuda .................. G06F 21/33
  708/203
2004/0255113 A1 * 12/2004 Ogura .................. H04L 63/062
  713/156

(Continued)

FOREIGN PATENT DOCUMENTS

CN 1901447 A 1/2007
CN 101194461 A 6/2008

(Continued)

OTHER PUBLICATIONS

Combined Office Action and Search Report issued on Aug. 7, 2015 in Chinese Patent Application No. 201310063886.X with English translation of category of cited documents.

(Continued)

*Primary Examiner* — Chau Le
(74) *Attorney, Agent, or Firm* — Oblon, McClelland, Maier & Neustadt, L.L.P.

(57) ABSTRACT

A network system includes a management apparatus and multiple apparatuses. The management apparatus includes a preparation instruction unit to transmit an instruction to prepare a certificate request to the apparatuses; a collection unit to collect the certificate requests; a request unit to request issuance of certificates to a certificate authority; a resetting instruction unit to transmit the issued certificates to the apparatuses and to instruct resetting of certificates. The apparatus includes a storing unit including an operation area for storing a first certificate and a provisional operation area; a provisionally operating unit to transfer the first certificate to the provisional operation area, and to generate a certificate request, and to transmit the certificate request to the management apparatus; a setting unit to store a second certificate, issued by the certificate authority, in the operation area, and to instruct a communication unit to conduct the communication by switching a certificate.

20 Claims, 5 Drawing Sheets

(56) References Cited

U.S. PATENT DOCUMENTS

| | | | |
|---|---|---|---|
| 2005/0160259 A1* | 7/2005 | Ogura | H04L 9/00 713/156 |
| 2005/0160260 A1 | 7/2005 | Yasuda | |
| 2007/0005981 A1* | 1/2007 | Miyazawa | H04L 63/0428 713/176 |
| 2007/0130439 A1 | 6/2007 | Andersson et al. | |
| 2007/0168658 A1 | 7/2007 | Yamauchi | |
| 2008/0046720 A1* | 2/2008 | Sugishita | G06F 21/629 713/156 |
| 2008/0307229 A1 | 12/2008 | Andersson et al. | |

FOREIGN PATENT DOCUMENTS

| | | |
|---|---|---|
| EP | 1 732 263 A1 | 12/2006 |
| EP | 1 744 485 A1 | 1/2007 |
| JP | 11-8619 A | 1/1999 |
| JP | 2004-227451 A | 8/2004 |
| JP | 2005-130451 | 5/2005 |
| JP | 2005-175992 | 6/2005 |
| JP | 2006-270646 A | 10/2006 |
| JP | 2007-500972 A | 1/2007 |
| JP | 2008-160384 A | 7/2008 |
| JP | 2008-262564 | 10/2008 |
| JP | 2010-251945 A | 11/2010 |
| WO | WO 2007/062955 A1 | 6/2007 |

OTHER PUBLICATIONS

Office Action issued Sep. 29, 2015 in Japanese Patent Application No. 2012-041404.

Extended European Search Report issued May 6, 2013, in European Patent Application No. 13154559.2.

* cited by examiner

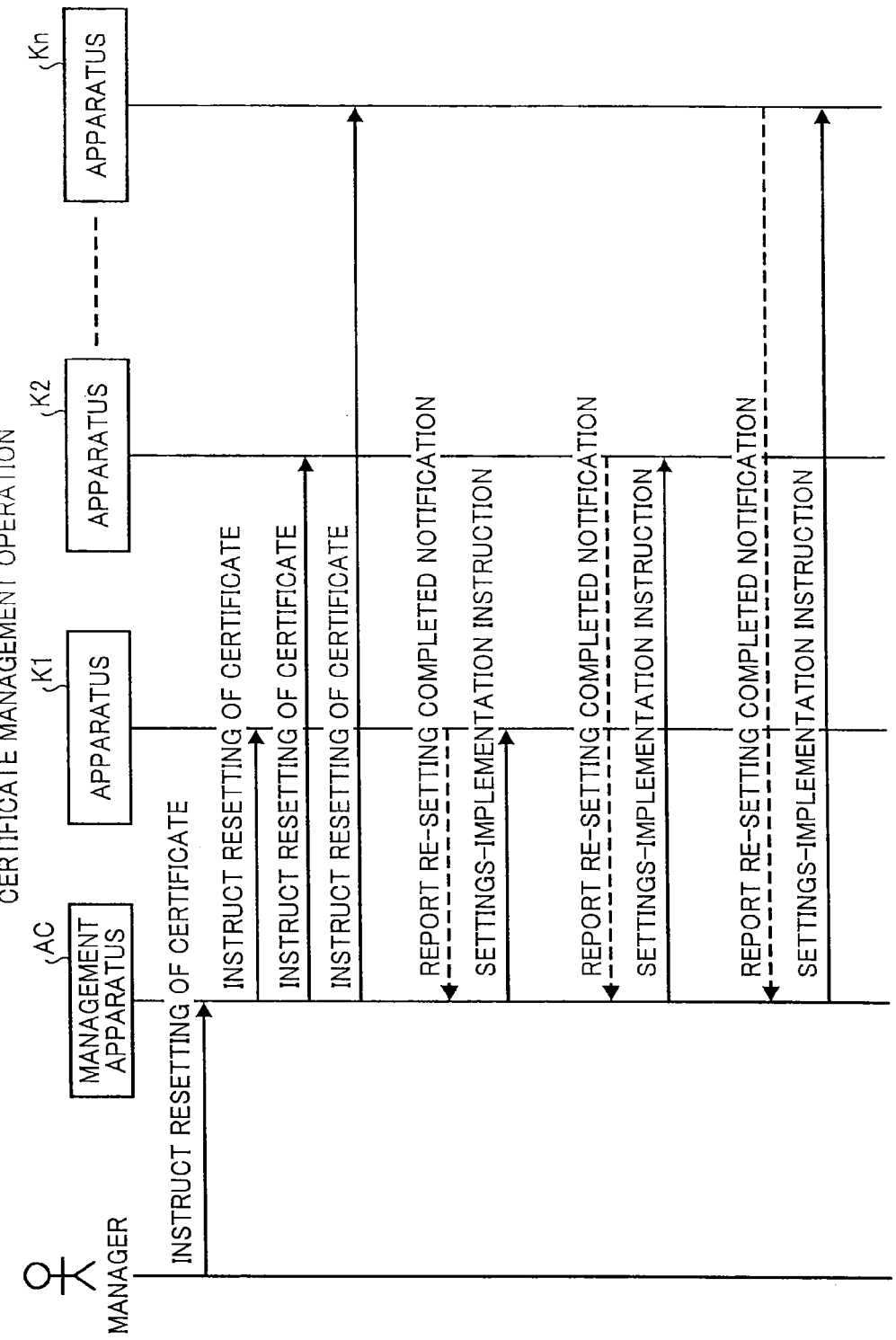

NETWORK SYSTEM, CERTIFICATE MANAGEMENT METHOD, AND CERTIFICATE MANAGEMENT PROGRAM

CROSS-REFERENCE TO RELATED APPLICATION

The present continuation application claims the benefit of Priority under 35 U.S.C. §120 to application Ser. No. 13/762,638, filed on Feb. 8, 2013, and claims the benefit of priority under to 35 U.S.C. §119 from Japanese Patent Application No. 2012-041404, filed on Feb. 28, 2012, the entire contents of application Ser. No. 13/762,638, are hereby incorporated herein by reference.

BACKGROUND

1. Technical Field

The present invention relates to a network system, a certificate management method, and a certificate management program, and more particularly to, a network system, a certificate management method, and a certificate management program that resets the certificate quickly, easily, and inexpensively.

2. Background Art

With the diffusion of networks such as the Internet, data communications can now be conducted using wired- and/or wireless-type networks. Such network-based data communications require protection from tampering such as data falsification, spoofing, or the like.

Typically, an image processing apparatus located at an end-user site is connected to a management-purpose information processing apparatus located at a vendor site (e.g., manufacturer of apparatus, maintenance service provider, etc.) via a network such as the Internet. The user site may be a business office, which may use copiers, printers, facsimiles, and multi-functional peripherals such as image processing apparatuses. The vendor site may include management-purpose information processing apparatuses to monitor image processing apparatuses located at user sites via the Internet. Specifically, in such a configuration, an image processing apparatus at a user site and a management-purpose information processing apparatus may communicate data used for managing the image processing apparatus. Because the management-purpose information processing apparatus may be located remotely from the user site, such configurations may be termed remote monitoring systems, which monitor the image processing apparatus remotely and provide services such as maintenance at predetermined regular intervals or under certain specific circumstances.

Such remote monitoring/management systems may need to communicate classified information such as service fee data, user personal data, or the like, as management data. Accordingly, it is necessary to prevent tampering with such data such as data falsification and/or spoofing.

Typically, such remote monitoring/management systems employ encryption to prevent such data falsification and/or spoofing. For example, image processing apparatuses at user sites or user-side management-purpose information processing apparatuses may communicate with a vendor-side management-purpose information processing apparatus by employing a mutual authentication process using encryption such as secure socket layer (SSL), for example.

Such SSL communication for remote monitoring systems may employ an encryption system such as a private/public key system for data communication. For example, a vendor-side management-purpose information processing apparatus keeps a private key, and a user-side management-purpose information processing apparatus or an image processing apparatus at the user site keeps a public key. Further, the vendor-side apparatus and the user-side apparatus use a common key certificate encoded by a common private key issued by a certificate authority to verify the identity of a data-transmission sender. With such a configuration, tampering such as data falsification and/or spoofing can be prevented, and data security can be enhanced.

However, to use such certificate system on a network connecting a number of apparatuses, the certificate needs to be set up at each apparatus. Therefore, if the number of apparatuses connected to the network increases to hundreds or thousands, the construction of an environment that can support certificate use entails greater costs not only initially but also for ongoing maintenance and management of the certificates.

In a conventional certificate distribution system, the setting-use private key/certificate can be provided for each of setting-target apparatuses and a management terminal apparatus in advance, and then the verification process and key sharing are conducted, and communications are protected by encoding. Upon completing the setting, the setting-use private key/certificate provided for the setting-target apparatuses are then deleted, thereby disabling the setting-use private key/certificate.

In such conventional certificate management method, upon completing the setting by using the setting-use private key/certificate, secure communication can be obtained. However, for example, when the expiry date of the certificate approaches and the certificate must be reset, because the setting-use private key/certificate have been deleted, the resetting of the certificate cannot be conducted with the same process as the initial introduction of private key/certificate.

In view of such problem, a method of not deleting the setting-use private key and certificate is disclosed in JP-2005-175992-A, in which the setting-use key and certificate are not deleted, and an operation mode flag is set for a setting-target apparatus. The certificate is reset using the setting-use private key/certificate in the setting mode, and then the mode is switched to the operating mode, thereby disabling the setting-use private key/certificate.

However, when the certificate expires and must be reset, the resetting of the certificate cannot be conducted in the same way as the initial introduction of the private key/certificate. As a result, while the current certificate is being maintained, the new certificate cannot be installed, making the certificate updating process inconvenient and costly.

SUMMARY

In one aspect of the present invention, a network system is devised. The network system includes a management apparatus; and a plurality of apparatuses manageable by the management apparatus, capable of secured communication with the management apparatus via a network using a certificate. The management apparatus includes a certificate request preparation instruction unit to transmit a instruction to prepare a certificate request to the plurality of apparatuses; a certificate request collection unit to collect the certificate requests prepared by the plurality of apparatuses in response to the instruction to prepare certificate request; a certificate issuance request unit to collectively request issuance of certificates for the plurality of apparatuses to a certificate authority; a certificate resetting instruction unit to transmit the certificates, issued in response to the certificate issuance request, to the corresponding apparatuses and to instruct resetting of certificate to each of the apparatuses, and each of the apparatuses includes: a certificate storing unit including an operation area for storing a first certificate being used for operation and a provisional operation area; a secured communication unit to conduct secured communication using the first certificate; a certificate provisionally operating unit to transfer the first certificate stored in the operation area to the provisional operation area upon receiving the instruction to prepare certificate request from the management apparatus, to instruct the secured communication unit to conduct the secured communication using the first certificate provisionally stored in the provisional operation area, and to prepare a public key pair and generate a certificate request based on the public key, and to transmit the certificate request to the management apparatus; a certificate setting unit, in response to the instruction to reset a certificate received from the management apparatus, to store a second certificate, issued by the certificate authority and transmitted from the management apparatus, in the operation area of the certificate storing unit, and to instruct the secured communication unit to conduct the secured communication by switching a certificate for secured communication from the first certificate provisionally stored in the provisional operation area to the second certificate stored in the operation area.

In another aspect of the present invention, a certificate management method for a management apparatus and a plurality of apparatuses manageable by the management apparatus capable of secured communication with the management apparatus in a network system using a certificate is devised. The method includes the steps of: in the management apparatus, 1) transmitting a instruction to prepare a certificate request to the plurality of apparatuses; 2) collecting the certificate request prepared by the plurality of apparatuses in response to the instruction to prepare certificate request; 3) requesting issuance of certificates of the plurality of apparatuses collectively to a certificate authority; 4) transmitting the certificates issued in response to the certificate issuance request to the corresponding apparatuses and instructing resetting of certificate; in the each of the apparatuses, 5) conducting secured communication using a certificate stored in a certificate storing unit including an operation area for storing a first certificate being used for operation and a provisional operation area; 6) transferring the first certificate stored in the operation area to the provisional operation area upon receiving the instruction to prepare certificate request from the management apparatus; 7) conducting the secured communication using the first certificate provisionally stored in the provisional operation area; 8) preparing a public key pair to generate a certificate request based on the public key, and transmitting the certificate request to the management apparatus; 9) in response to the instruction of resetting certificate received from the management apparatus, storing a second certificate, issued by the certificate authority and transmitted from the management apparatus, in the operation area of the certificate storing unit; and 10) conducting the secured communication by switching a certificate for secured communication from the first certificate provisionally stored in the provisional operation area to the second certificate stored in the operation area.

In another aspect of the present invention, a non-transitory computer-readable storage medium storing a program that, when executed by a computer, causes the computer to execute a method of certificate management for a management apparatus and a plurality of apparatuses manageable by the management apparatus capable of secured communication with the management apparatus in a network system using a certificate is devised. The method includes the steps of: in the management apparatus, 1) transmitting a instruction to prepare a certificate request to the plurality of apparatuses; 2) collecting the certificate request prepared by the plurality of apparatuses in response to the instruction to prepare certificate request; 3) requesting issuance of certificates of the plurality of apparatuses collectively to a certificate authority; 4) transmitting the certificates issued in response to the certificate issuance request to the corresponding apparatuses and instructing resetting of certificate; in the each of the apparatuses, 5) conducting secured communication using a certificate stored in a certificate storing unit including an operation area for storing a first certificate being used for operation and a provisional operation area; 6) transferring the first certificate stored in the operation area to the provisional operation area upon receiving the instruction to prepare certificate request from the management apparatus; 7) conducting the secured communication using the first certificate provisionally stored in the provisional operation area; 8) preparing a public key pair to generate a certificate request based on the public key, and transmitting the certificate request to the management apparatus; 9) in response to the instruction of resetting certificate received from the management apparatus, storing a second certificate, issued by the certificate authority and transmitted from the management apparatus, in the operation area of the certificate storing unit; and 10) conducting the secured communication by switching a certificate for secured communication from the first certificate provisionally stored in the provisional operation area to the second certificate stored in the operation area.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6 shows a sequence of certificate management process.

Figure 1A:
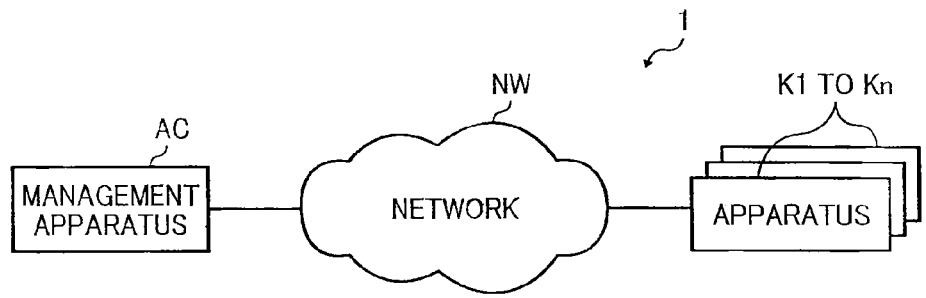
FIG. 1A shows an example configuration of a network system according to an example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, an apparatus or system according to an example embodiment is described hereinafter.

FIGS. 1 to 6 show an example of a network system operable with a certificate management method and a certificate management program according to an example embodiment. FIG. 1 shows an example of a system configuration of a network system 1 using the certificate management method and certificate management program according to an example embodiment.

As shown in FIG. 1, the network system 1 can be configured with a management apparatus AC and a plurality of apparatuses K1 to Kn connectable with each other via a network NW such as wired or wireless network such as the Internet.

The apparatuses K1 to Kn are, for example, image processing apparatuses such as multi-functional apparatuses, facsimile machines, copiers, printers, scanners, and computers, and the apparatuses K1 to Kn can be set with certificates required for authentication. The management apparatus AC and the apparatuses K1 to Kn connectable with each other in a network communication environment can use certificate-based security functions such as encoding/decoding function, mutual authentication function, and digital signature function.

Figure 1B:
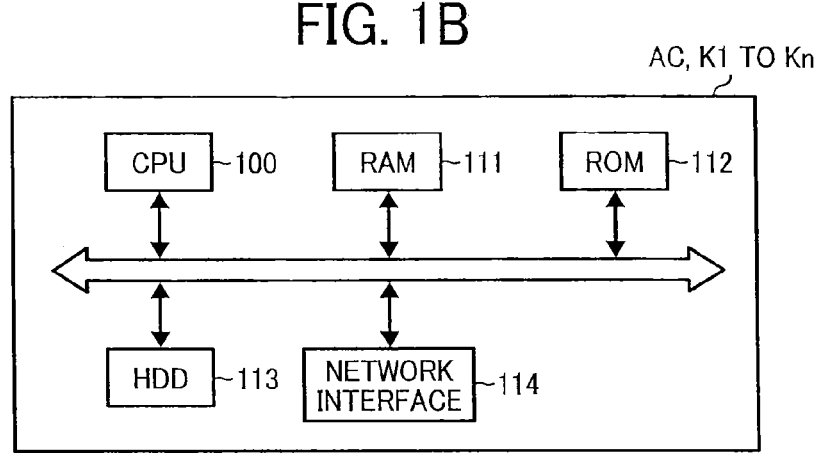
FIG. 1B shows an example of a hardware block diagram of apparatuses used in the network system.

A description is given of a hardware configuration of apparatuses such as the management apparatus AC and the plurality of apparatuses K1 to Kn used in the network system 1 with references FIG. 1B. The apparatus includes, for example, a central processing unit (CPU) 110, a random access memory (RAM) 111, a read only memory (ROM) 112, a hard disk drive (HDD) 113, and a network interface 114, connectable with each other by using a bus. The CPU 110 controls each unit based on programs and commands, and conducts given computing processes as required. The RAM 111 reads program from the ROM 112, and the HDD 13, and an external storage or memory, and reads and writes image data and various parameters. The ROM 112 and the HDD 113 store various data such as image data and parameters, and programs used for given processing. The network interface 114 can be used to connect with other apparatuses via the network NW, and used for inputting/outputting image data and parameters, and reading and distribution of programs.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a Wireless Application Protocol (WAP) or 3G-compliant phone) and so on. Since the present invention can be implemented as software, each and every aspect of the present invention thus encompasses computer software implementable on a programmable device.

The computer software can be provided to the programmable device using any storage medium or carrier medium for storing processor readable code such as a flexible disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, work station) may control an information processing apparatus or an image processing apparatus such as image forming apparatus using a computer-readable program, which can execute the above-described processes or steps. In the above described embodiments, at least one or more of the units of apparatus can be implemented in hardware or as a combination of hardware/software combination. In example embodiment, processing units, computing units, or controllers can be configured with using various types of processors, circuits, or the like such as a programmed processor, a circuit, an application specific integrated circuit (ASIC), used singly or in combination.

The certificate management program for implementing certificate management method according to an example embodiment can be stored in the above described storage medium or carrier medium. The apparatuses K1 to Kn can read the certificate management program from such storage medium or carrier medium, and can be configured as apparatuses to conduct the certificate management efficiently with relatively low cost.

Figure 2:
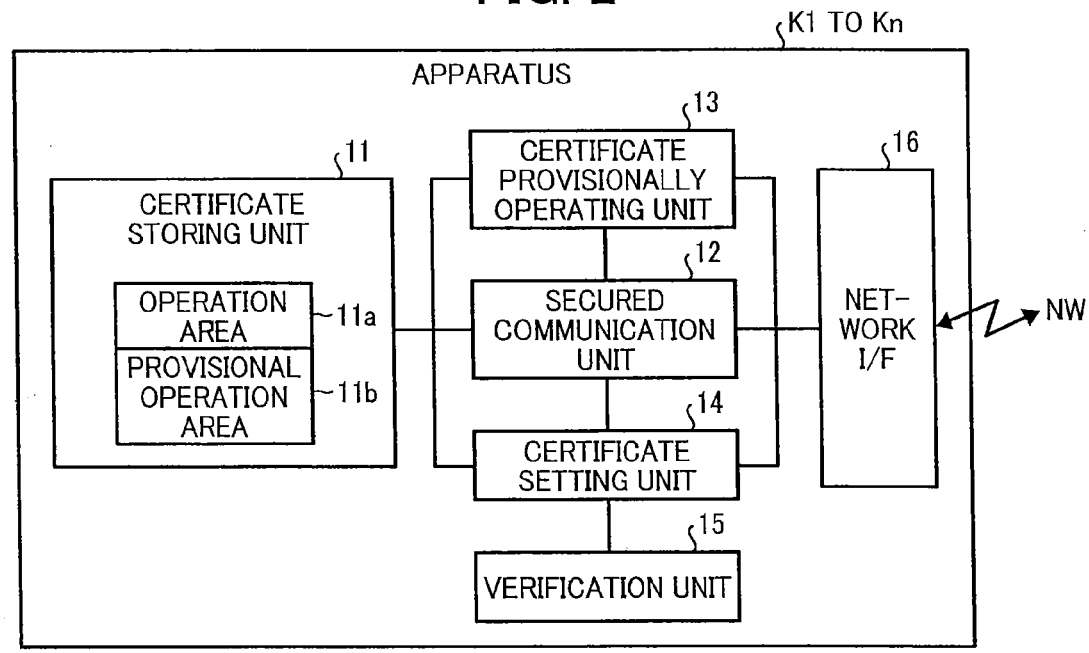
FIG. 2 shows a functional block diagram of an apparatus.

For example, each of the apparatuses K1 to Kn can configure functional block diagram shown in FIG. 2 by installing the certificate management program.

Specifically, by installing the certificate management program on an operating system (OS), as shown in FIG. 2, each one of the apparatuses K1 to Kn can be configured with, for example, a certificate storing unit 11, a secured communication unit 12, a certificate provisionally operating unit 13, a certificate setting unit 14, a verification unit 15, and a network interface (I/F) 16.

The network I/F 16 can be connected to the network NW connected with the management apparatus AC, and used as a communication interface of the apparatuses K1 to Kn via the network NW.

The certificate storing unit 11 is, for example, a re-writable non-volatile memory, and includes an operation area 11a and a provisional operation area 11b. The operation area 11a is a storage area used for storing a certificate, which is currently used for operation. The provisional operation area 11b is a storage area used for temporarily storing a certificate that has been used and is to be updated very soon. Specifically, when the expiry of such certificate approaches and is required to be updated, such certificate is transferred to the provisional operation area 11b to continue the certificate-based operation using the such transferred certificate.

The secured communication unit 12 uses the certificate stored in the certificate storing unit 11 for secured communication such as encoding/decoding function, mutual authentication function, and digital signature function with the management apparatus AC via the network NW.

Upon receiving a instruction to prepare certificate request from the management apparatus AC via the network I/F 16, the certificate provisionally operating unit 13 transfers a certificate stored in the operation area 11a to the provisional operation area 11b of the certificate storing unit 11. Then, the certificate provisionally operating unit 13 instructs the secured communication unit 12 to conduct the secured communication using such certificate transferred and stored in the provisional operation area 11b. Further, the certificate provisionally operating unit 13 prepares public key pair (public key and private key) to generate a certificate request based on the public key, and transmits the certificate request to the management apparatus AC. For the simplicity of expressions, the certificate stored in the operation area 11a and to be updated may be referred to a first certificate (or certificate A), and a certificate to replace the first certificate may be referred to a second certificate (or certificate B) in this disclosure.

Upon receiving an instruction for resetting certificate from the management apparatus AC via the network I/F 16, the certificate setting unit 14 instructs the verification unit 15 to verify validity of the received certificate. If the verification unit 15 verifies the validity of the received certificate, in line with the instruction of resetting certificate, the certificate setting unit 14 stores a certificate, issued by a certificate authority (CA) and transmitted from the management apparatus AC, in the operation area 11a of the certificate storing unit 11. Then, the certificate setting unit 14 instructs the secured communication unit 12 to conduct the secured communication by switching the certificate for secured communication from a certificate provisionally stored in the provisional operation area 11b to a certificate stored in the operation area 11a. If the verification unit 15 rejects the validity of certificate, the certificate setting unit 14 reports such validity rejection to the management apparatus AC.

The verification unit 15 verifies the validity of certificate transmitted with the instruction of resetting certificate from the management apparatus AC, and outputs a verification result to the certificate setting unit 14. The verification unit 15 verifies the validity of certificate, for example, by verifying that a certificate is issued by a authentic or reliable certificate authority (CA), and by verifying that the expiry date of certificate is correct, etc.

The management apparatus AC can be configured using a typical hardware configuration and software configuration, and a computing device installed with the certificate management program for implementing the certificate management method according to an example embodiment.

The certificate management program for implementing certificate management method according to an example embodiment can be stored in the above described storage medium or carrier medium. Similar to the above described apparatuses K1 to Kn, the management apparatus AC can read the certificate management program from such storage medium or carrier medium, and can be configured as apparatuses to conduct the certificate management efficiently with relatively low cost.

Figure 3:
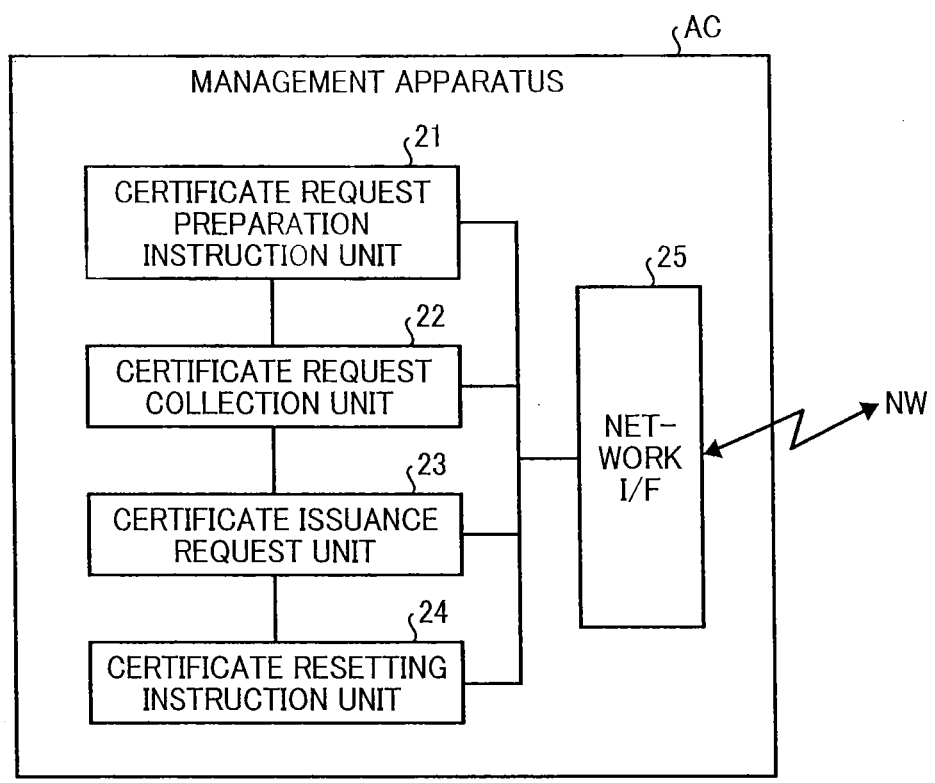
FIG. 3 shows a functional block diagram of a management apparatus.

By installing the certificate management program on an operating system (OS), the management apparatus AC can be configured with a functional block diagram shown in FIG. 3.

As shown in FIG. 3, the management apparatus AC can be configured with, for example, a certificate request preparation instruction unit 21, a certificate request collection unit 22, a certificate issuance request unit 23, a certificate resetting instruction unit 24, and a network I/F 25.

When a certificate currently-used for security functions (e.g., encoding/decoding function, mutual authentication function, and digital signature function) is required to be updated, the certificate request preparation instruction unit 21 transmits a certificate request preparation instruction to a plurality of the apparatuses K1 to Kn via the network I/F 25 and the network NW to initiate updating of certificate.

Then, the certificate request collection unit 22 collects certificate requests prepared by the apparatuses K1 to Kn in response to such instruction to prepare certificate request via the network NW and the network I/F 25.

Then, the certificate issuance request unit 23 collectively transmits the collected certificate requests for a plurality of the apparatuses K1 to Kn to a certificate authority CA to collectively request issuing of certificates for the apparatuses K1 to Kn.

The above mentioned certificate authority CA is, for example, an external certificate authority. If the management apparatus AC has a function of certificate authority, the management apparatus AC can function as the certificate authority CA to issue a certificate.

The certificate authority CA examines the certificate request received from the management apparatus AC, and then issues a certificate based on the examination result. Specifically, the certificate authority CA examines whether the certificate request is not tampered, whether the name of certificate requester is authentic or the like.

The certificate resetting instruction unit 24 transmits a certificate, issued by a certificate authority CA in response to the certificate issuance request that is requested to the plurality of apparatuses K1 to Kn, using security functions via the network I/F 25 and the network NW, and instructs a resetting of certificate to the plurality of apparatuses K1 to Kn.

A description is given of certificate resetting operation of the network system 1. In the network system 1, the resetting of certificate can be conducted simply and less expensively while maintaining effectiveness of certificate-based operation during the resetting operation for certificate.

In the network system 1, the management apparatus AC and each of the apparatuses K1 to Kn conduct the secured communication using certificates having expiry period such as expiry date, and such certificates are required to be updated before the expiry date.

The management apparatus AC manages the expiry date of certificate of each of the apparatuses K1 to Kn based on certificate management information such as the expiry date of certificate of each of the apparatuses K1 to Kn. The certificate management information is collected and stored in an internal non-volatile memory, used as an information storing unit, by the certificate request preparation instruction unit 21.

Figure 4:
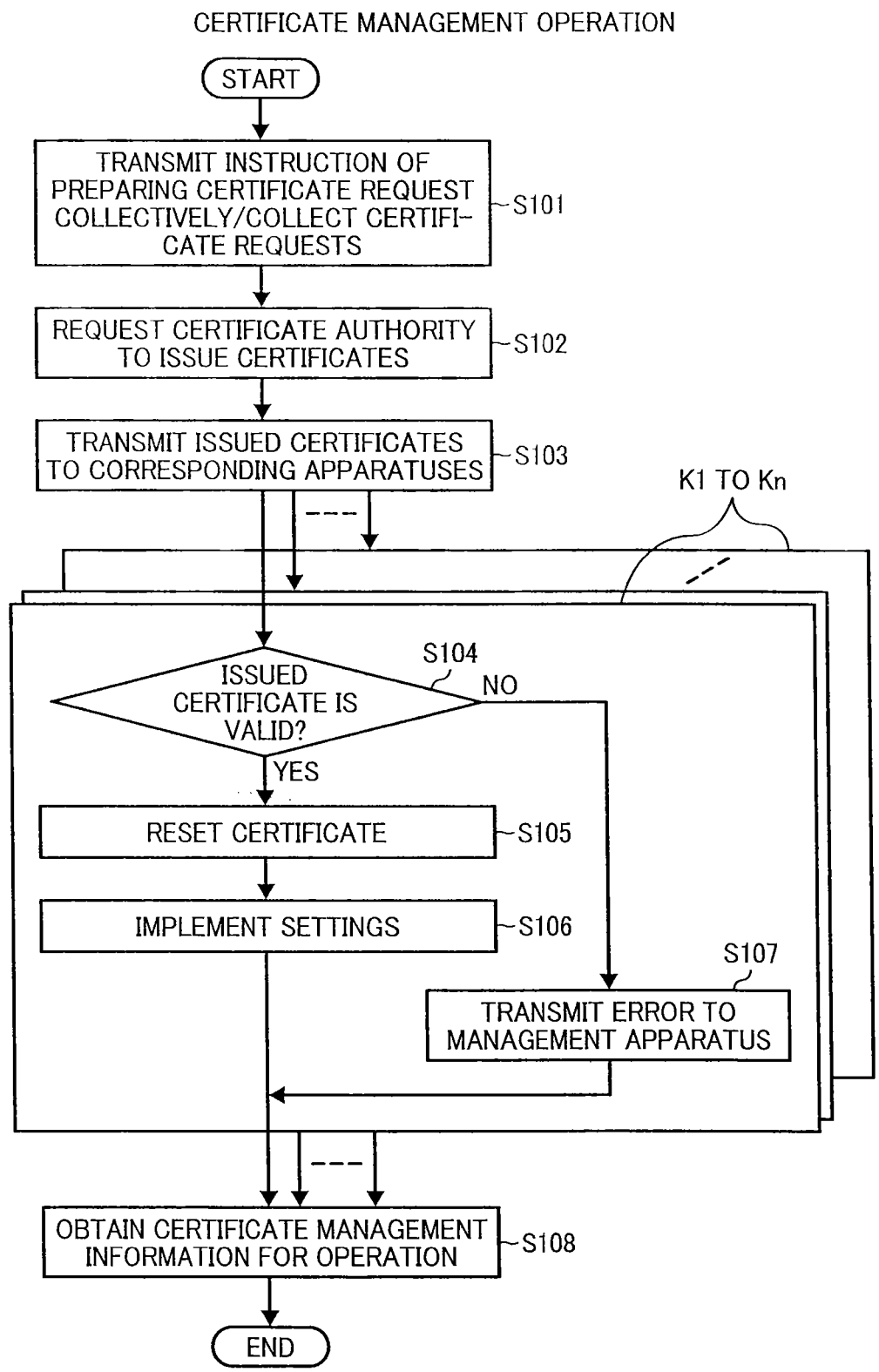
FIG. 4 shows a flowchart of steps of process of certificate management.

When the expiry date of certificate of one or more of the plurality of the apparatuses K1 to Kn is to come within a given time, as shown in FIG. 4, the certificate request preparation instruction unit 21 collectively transmits the instruction to prepare certificate request to the plurality of the apparatuses K1 to Kn (step S101) via the network I/F 25 and the network NW to update the certificate.

Such instruction to prepare certificate request is received by each of the apparatuses K1 to Kn, at which the secured communication unit 12 is currently using a certificate (hereinafter, certificate A) stored in the operation area 11a of the certificate storing unit 11 as shown in FIG. 5(a).

When each of the apparatuses K1 to Kn receives the instruction to prepare certificate request, the certificate provisionally operating unit 13 transfers the certificate A from the operation area 11a to the provisional operation area 11b as shown in FIG. 5(b), and then instructs the secured communication unit 12 to use the certificate A transferred to the provisional operation area 11b for the subsequent secured communication.

As such, the certificate provisionally operating unit 13 changes a storage area of certificate, and then the certificate provisionally operating unit 13 instructs the secured communication unit 12 to conduct an operation using the certificate A stored in the provisional operation area 11b, which is a storage area after transferring the certificate A. Then, the certificate provisionally operating unit 13 prepares a public key pair (public key and private key), generates a certificate request using the public key, stores the certificate request in the operation area 11a as shown in FIG. 5(b), and then transmits the certificate request to the management apparatus AC.

In the management apparatus AC, the certificate request collection unit 22 collects the certificate requests generated by each of the apparatuses K1 to Kn (step S101). The certificate issuance request unit 23 collectively transmits the certificate requests, generated by each of the apparatuses K1 to Kn and collected by the certificate request collection unit 22, to a certificate authority CA to request the certificate authority CA to issue certificates (step S102).

Upon receiving the certificate request from the management apparatus AC, the certificate authority CA examines the certificate request and then issues a certificate based on the examination result. Specifically, the certificate authority CA examines whether the certificate request is not tampered, whether the name of certificate requester is authentic, or the like. The certificate authority CA transmits the issued certificate to the management apparatus AC.

Upon receiving the certificate issued by the certificate authority CA, as shown in FIG. 4, the certificate resetting instruction unit 24 of the management apparatus AC transmits each of issued certificates to each of the corresponding apparatuses K1 to Kn via the network I/F 25 and the network NW (step S103), and instructs the resetting of certificate to each of the corresponding apparatuses K1 to Kn.

Upon receiving the certificate and instruction of resetting certificate, the verification unit 15 of each of the apparatuses K1 to Kn determines whether the issued certificate is valid (step S104).

Figure 5:
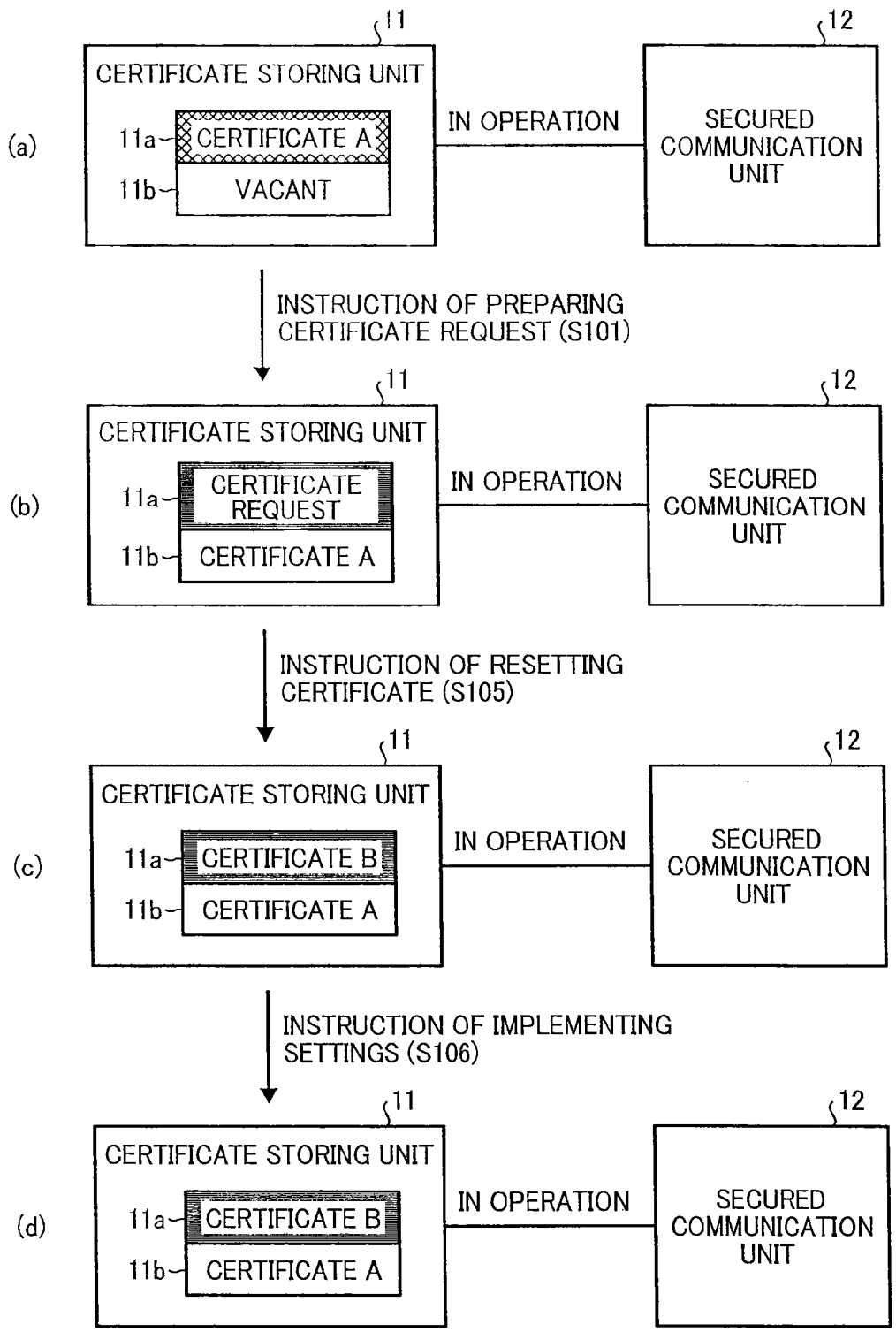
FIGS. 5(*a*) to 5(*d*) show a process of certificate management in an apparatus.

If the verification unit 15 determines that certificate is valid (step S104: YES), the certificate setting unit 14 stores (or resets) a certificate (hereinafter, certificate B as shown in FIG. 5), which is received from the management apparatus AC, in the operation area 11a of the certificate storing unit 11 as shown in FIG. 5(c) (step S105), and each of the apparatuses K1 to Kn reports a re-setting completed notification to the management apparatus AC as shown by the dotted line in FIG. 6. Upon receiving the re-setting completed notification from the apparatuses K1 to Kn, the certificate resetting instruction unit 24 of the management apparatus AC transmits a settings-implementation instruction to the apparatuses K1 to Kn shown by the solid line as shown in FIG. 6.

Upon receiving the settings-implementation instruction, the certificate setting unit 14 of each of the apparatuses K1 to Kn conducts a settings-implementation process, in which the certificate setting unit 14 instructs the secured communication unit 12 to switch the certificate used for certificate-based operation such as secured communication. Specifically, as shown in FIG. 5(d), the secured communication unit 12 switches the certificate used for certificate-based operation from the certificate A provisionally stored in the provisional operation area 11b to the certificate B now being stored in the operation area 11a. Then, the certificate setting unit 14 transmits an implemented result to the management apparatus AC (step S106).

By conducting the above described certificate update process, not only the certificates of the apparatuses K1 to Kn are generated but also the public key pair is generated when preparing the certificate request as above described, and thereby the update of private key and public key can be also conducted when updating the certificate.

Further, if the verification unit 15 determines that the certificate is invalid (step S104: NO), the certificate setting unit 14 rejects the setting of certificate, and transmits such rejection to the management apparatus AC as an error message (step S107).

When the management apparatus AC receives notifications from the apparatuses K1 to Kn that the setting of new certificates are implemented and completed at the apparatuses K1 to Kn, the certificate request preparation instruction unit 21 stores certificate management information related to the certificate such as expiry information in a non-volatile memory used as an information storing unit (step S108). Such stored certificate management information can be used when a next certificate management process is conducted, in which based on the certificate management information, a preparation request of certificate request is conducted.

Further, upon receiving the error message indicating the certificate is invalid from the apparatuses K1 to Kn, the management apparatus AC conducts a given process for such error situation such as reporting to an administrator/manager set in advance, and requesting the certificate authority CA to issue a certificate again.

In the above-described example embodiment, a network system is devised. The network system includes a management apparatus (AC); and a plurality of apparatuses (K1-Kn) manageable by the management apparatus (AC), capable of secured communication with the management apparatus (AC) via a network using a certificate. The management apparatus (AC) includes a certificate request preparation instruction unit (21) to transmit a instruction to prepare a certificate request to the plurality of apparatuses (K1-Kn); a certificate request collection unit (22) to collect the certificate requests prepared by the plurality of apparatuses (K1-Kn) in response to the instruction to prepare certificate request; a certificate issuance request unit (23) to collectively request issuance of certificates for the plurality of apparatuses (K1-Kn) to a certificate authority; a certificate resetting instruction unit (24) to transmit the certificates, issued in response to the certificate issuance request, to the corresponding apparatuses (K1-Kn) and to instruct resetting of certificate to each of the apparatuses (K1-Kn). Each of the apparatuses (K1-Kn) includes a certificate storing unit (11) including an operation area (11a) for storing a first certificate being used for operation and a provisional operation area (11b); a secured communication unit (12) to conduct secured communication using the first certificate; a certificate provisionally operating unit (13) to transfer the first certificate stored in the operation area (11a) to the provisional operation area (11b) upon receiving the instruction to prepare certificate request from the management apparatus (AC), to instruct the secured communication unit (12) to conduct the secured communication using the first certificate provisionally stored in the provisional operation area (11b), and to prepare a public key pair and generate a certificate request based on the public key, and to transmit the certificate request to the management apparatus (AC); and a certificate setting unit (14), in response to the instruction to reset a certificate received from the management apparatus (AC), to store a second certificate, issued by the certificate authority and transmitted from the management apparatus (AC), in the operation area (11a) of the certificate storing unit (11), and to instruct the secured communication unit (12) to conduct the secured communication by switching a certificate for secured communication from the first certificate provisionally stored in the provisional operation area (11b) to the second certificate stored in the operation area (11a).

In such configuration according to the above-described example embodiment, the setting-use private key and certificate are not required to be separately managed by the apparatuses K1 to Kn for distributing a next certificate, and an operation mode is not required to be switched to use the setting-use private key and certificate. In such configuration according to the above-described example embodiment, the resetting of certificate for a plurality of the apparatuses K1 to Kn can be concurrently conducted using the currently used certificate while maintaining secured communication, by which the resetting of certificate can be conducted for a plurality of apparatuses K1 to Kn less expensively and safely.

In the above-described example embodiment, a certificate management method for a management apparatus (AC) and a plurality of apparatuses (K1-Kn) manageable by the management apparatus (AC) capable of secured communication with the management apparatus (AC) in a network system using a certificate is devised. The method includes the following steps. In the management apparatus (AC), 1) transmitting a instruction to prepare a certificate request to the plurality of apparatuses (K1-Kn); 2) collecting the certificate request prepared by the plurality of apparatuses (K1-Kn) in response to the instruction to prepare certificate request; 3) requesting issuance of certificates of the plurality of apparatuses (K1-Kn) collectively to a certificate authority; and 4) transmitting the certificates issued in response to the certificate issuance request to the corresponding apparatuses (K1-Kn) and instructing resetting of certificate. In the each of the apparatuses (K1-Kn), 5) conducting secured communication using a certificate stored in a certificate storing unit (11) including an operation area (11a) for storing a first certificate being used for operation and a provisional operation area (11b); 6) transferring the first certificate stored in the operation area (11a) to the provisional operation area (11b) upon receiving the instruction to prepare certificate request from the management apparatus (AC); 7) conducting the secured communication using the first certificate provisionally stored in the provisional operation area (11b); 8) preparing a public key pair to generate a certificate request based on the public key, and transmitting the certificate request to the management apparatus (AC); 9) in response to the instruction of resetting certificate received from the management apparatus (AC), storing a second certificate, issued by the certificate authority and transmitted from the management apparatus (AC), in the operation area (11a) of the certificate storing unit (11); 10) conducting the secured communication by switching a certificate for secured communication from the first certificate provisionally stored in the provisional operation area (11b) to the second certificate stored in the operation area (11a).

In such configuration according to the above-described example embodiment, the setting-use private key and certificate are not required to be separately managed by the apparatuses K1 to Kn for distributing a next certificate, and an operation mode is not required to be switched to use the setting-use private key and certificate. In such configuration according to the above-described example embodiment, the resetting of certificate for a plurality of the apparatuses K1 to Kn can be concurrently conducted using the currently used certificate while maintaining secured communication, by which the resetting of certificate can be conducted for a plurality of apparatuses K1 to Kn less expensively and safely.

In the above-described example embodiment, a non-transitory computer-readable storage medium storing a program that, when executed by a computer, causes the computer to execute a method of certificate management for a management apparatus (AC) and a plurality of apparatuses (K1-Kn) manageable by the management apparatus (AC) capable of secured communication with the management apparatus (AC) in a network system using a certificate is devised. The method includes the following steps. In the management apparatus (AC), 1) transmitting a instruction to prepare a certificate request to the plurality of apparatuses (K1-Kn); 2) collecting the certificate request prepared by the plurality of apparatuses (K1-Kn) in response to the instruction to prepare certificate request; 3) requesting issuance of certificates of the plurality of apparatuses (K1-Kn) collectively to a certificate authority; and 4) transmitting the certificates issued in response to the certificate issuance request to the corresponding apparatuses (K1-Kn) and instructing resetting of certificate. In the each of the apparatuses (K1-Kn), 5) conducting secured communication using a certificate stored in a certificate storing unit (11) including an operation area (11a) for storing a first certificate being used for operation and a provisional operation area (11b); 6) transferring the first certificate stored in the operation area (11a) to the provisional operation area (11b) upon receiving the instruction to prepare certificate request from the management apparatus (AC); 7) conducting the secured communication using the first certificate provisionally stored in the provisional operation area (11b); 8) preparing a public key pair to generate a certificate request based on the public key, and transmitting the certificate request to the management apparatus (AC); 9) in response to the instruction of resetting certificate received from the management apparatus (AC), storing a second certificate, issued by the certificate authority and transmitted from the management apparatus (AC), in the operation area (11a) of the certificate storing unit (11); 10) conducting the secured communication by switching a certificate for secured communication from the first certificate provisionally stored in the provisional operation area (11b) to the second certificate stored in the operation area (11a).

In such configuration according to the above-described example embodiment, the setting-use private key and certificate are not required to be separately managed by the apparatuses K1 to Kn for distributing a next certificate, and an operation mode is not required to be switched to use the setting-use private key and certificate. In such configuration according to the above-described example embodiment, the resetting of certificate for a plurality of the apparatuses K1 to Kn can be concurrently conducted using the currently used certificate while maintaining secured communication, by which the resetting of certificate can be conducted for a plurality of apparatuses K1 to Kn less expensively and safely.

Further, as for the above described the network system 1, the management apparatus AC includes a non-volatile memory as an information storing unit to store certificate management information such as expiry information of certificates set for the apparatuses K1 to Kn. The certificate request preparation instruction unit 21 transmits the instruction to prepare certificate request based on the certificate management information stored in the non-volatile memory.

Therefore, the update of certificate, which has less time until the expiry date can be conducted automatically, less expensively, and efficiently.

Further, as for the above described the network system 1, each of the apparatuses K1 to Kn includes, for example, the verification unit 15 that verifies the validity of certificates transmitted from the management apparatus AC. The certificate setting unit 14 stores only the certificate verified as valid by the verification unit 15 to the operation area 11a in the certificate storing unit 11. Upon completing the certificate updating, the certificate setting unit 14 instructs the secured communication unit 12 to conduct the secured communication by switching the certificate for secured communication from a certificate provisionally stored in the provisional operation area 11b to a certificate stored in the operation area 11a.

With such configuration, a setting of invalid certificate can be prevented, and thereby security performance can be enhanced. As such, in the above-described example embodiment, the resetting of certificate can be conducted for a plurality of apparatuses less expensively and safely.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. A management apparatus for communicating with a plurality of devices via a network, the management apparatus comprising:
    circuitry configured to:
        transmit a certificate preparation request to the plurality of devices;
        collect the certificate preparation request prepared by each of the plurality of devices in response to the transmitted certificate preparation request;
        request issuing of certificate from a certificate authority by collectively collecting the certificate preparation request of the plurality of devices;
        conduct certificate resetting instruction by transmitting the issued certificate to each of the plurality of devices; and
        request the certificate authority to issue another certificate when a notice is received from the plurality of devices that the issued certificate is invalid.

2. The management apparatus of claim 1, wherein the management apparatus receives a notice from each of the plurality of devices that setting of the issued certificate has been conducted.

3. The management apparatus of claim 1, wherein the circuitry is further configured to:
    store certificate management information including time-limit information related to a certificate of the plurality of devices, and
    transmit the certificate preparation request based on the stored certificate management information.

4. The management apparatus of claim 1, wherein the certificate authority is external to the management apparatus.

5. The management apparatus of claim 1, wherein the circuitry is configured to report to a user regarding the issued certificate being invalid.

6. A management method for communicating with a plurality of devices via a network, the method comprising:
    transmitting, by circuitry of a management apparatus, a certificate preparation request to the plurality of devices;
    collecting, by the circuitry of the management apparatus, the certificate preparation request prepared by each of the devices in response to the transmitted certificate preparation request;
    requesting, by the circuitry of the management apparatus, issuing of certificate from a certificate authority by collectively collecting the certificate preparation request of the plurality of devices;
    conducting certificate resetting instruction, by the circuitry of the management apparatus, by transmitting the issued certificate to each of the plurality of devices; and
    requesting, by the circuitry of the management apparatus, the certificate authority to issue another certificate when the management apparatus receives a notice from the plurality of devices that the issued certificate is invalid.

7. The management method of claim 6, wherein the certificate authority is external to the management apparatus.

8. The management method of claim 6, further comprising:
    reporting to a user regarding the issued certificate being invalid.

9. The management method according to claim 6, further comprising:
    receiving a notice from each of the plurality of devices that setting of the issued certificate has been conducted.

10. The management method according to claim 6, further comprising:
    storing certificate management information including time-limit information related to the certificate of the plurality of devices.

11. The management method according to claim 10, further comprising:
    transmitting the certificate preparation request based on the stored certificate management information.

12. A device for communicating with a management apparatus via a network, the device comprising:
    circuitry configured to:
        store a certificate being in operation;
        conduct security communication using the certificate;
        generate a certificate preparation request and transmit the generated certificate preparation request to the management apparatus in response to receiving a certificate preparation request from the management apparatus;

shift a communication to the security communication using a certificate issued by a certificate authority and transmitted from the management apparatus along with a certificate resetting instruction from the management apparatus;

verify validity of the certificate transmitted from the management apparatus; and transmit an error to the management apparatus when the verification indicates that the certificate is invalid.

13. The device of claim 12, wherein the circuitry is further configured to:

shift the communication to the security communication using a certificate transmitted from the management apparatus when the verification indicates that a certificate is valid.

14. The device of claim 12, wherein the verification of the validity of the certificate is based on whether the certificate is issued by an authentic certificate authority.

15. The device of claim 12, wherein the verification of the validity of the certificate is based on whether an expiry date of the certificate is correct.

16. A method for communicating with a management apparatus via a network, the method comprising:

storing, by circuitry, a certificate being in operation;

conducting, by the circuitry, security communication using the certificate;

generating, by the circuitry, a certificate preparation request and transmitting the generated certificate preparation request to the management apparatus in response to receiving a certificate preparation request from the management apparatus;

shifting, by the circuitry, a communication to the security communication using a certificate issued by a certificate authority and transmitted from the management apparatus along with a certificate resetting instruction from the management apparatus;

verifying, by the circuitry, validity of the certificate transmitted from the management apparatus; and transmitting, by the circuitry, an error to the management apparatus when the verification indicates that the certificate is invalid.

17. The method of claim 16, wherein the verification of the validity of the certificate is based on whether the certificate is issued by an authentic certificate authority.

18. The method of claim 16, wherein the verification of the validity of the certificate is based on whether an expiry date of the certificate is correct.

19. The method according to claim 16, further comprising:

shifting the communication to the security communication using a certificate transmitted from the management apparatus when the verification indicates that a certificate is valid.

20. The method according to claim 19, wherein the verification of the validity of the certificate is based on whether an expiry date of the certificate is correct.

* * * * *